Feb. 21, 1939.                R. I. WARD                    2,147,781
                      DIFFERENTIAL PROTECTION MEANS
                  Filed Feb. 10, 1936        3 Sheets-Sheet 1
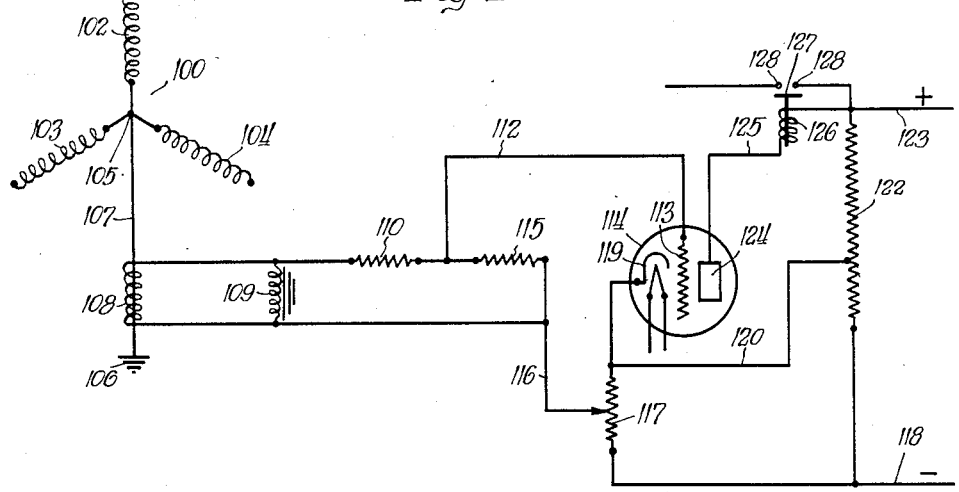
Fig. 4.
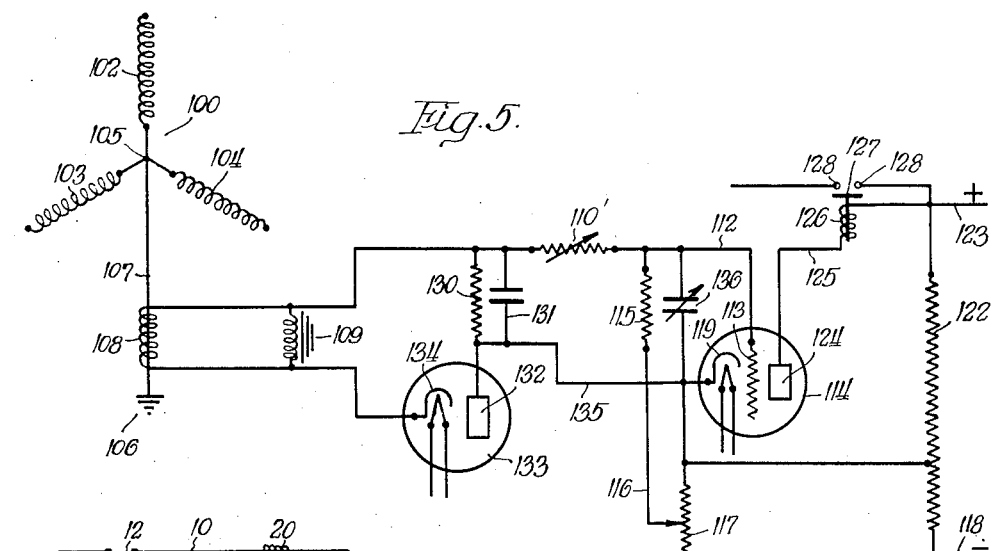
Fig. 5.
Fig. 1.
Inventor:
Robert I. Ward.

Inventor:
Robert I. Ward.

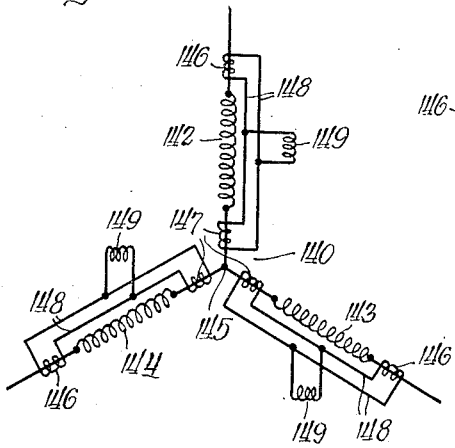
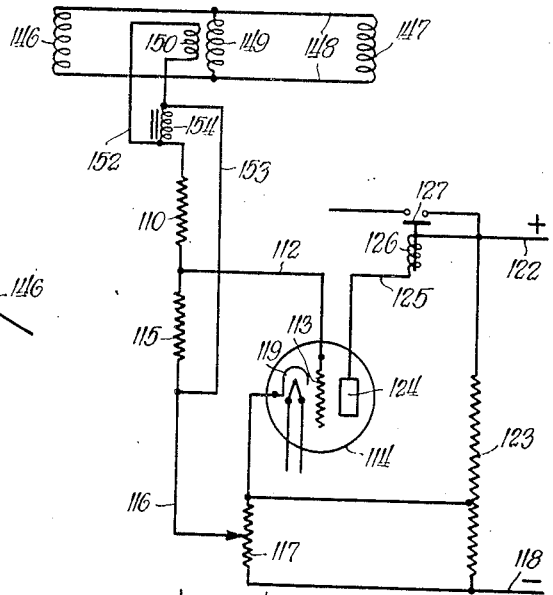
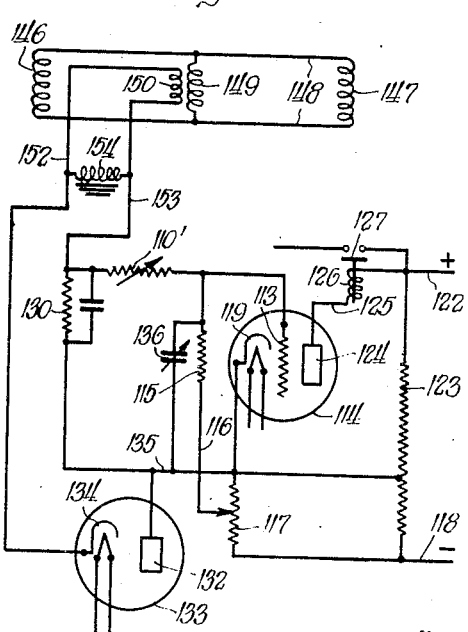
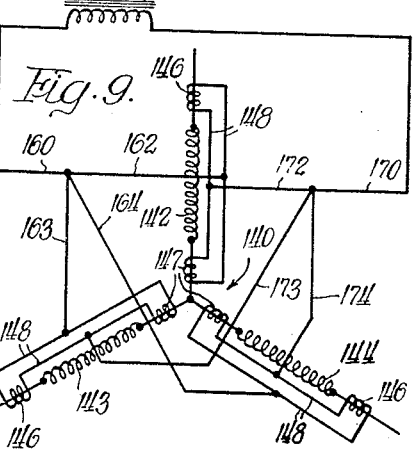

Patented Feb. 21, 1939

2,147,781

UNITED STATES PATENT OFFICE 2,147,781

DIFFERENTIAL PROTECTION MEANS

Robert I. Ward, Chicago, Ill.

Application February 10, 1936, Serial No. 63,135

2 Claims. (Cl. 175—294)

This invention relates to means for detecting and protecting against certain types of faults to which alternating current systems are subject, such as short circuits, grounds or other faults which produce unbalanced conditions in distribution lines or the like.

The particular invention described herein is a continuation in part of that disclosed in my copending application, Serial No. 573,754, filed November 9, 1931, now issued as Patent No. 2,047,343, dated July 14, 1936, and is directed particularly to the protection of lines against transformer faults or unbalanced conditions therein, and to the differential protection of sections of alternating current systems.

For this type of protection, the present alternating current distribution systems require apparatus that must be highly sensitive to unbalanced conditions and the like, being directional at approximately one percent normal voltage and operable in a fraction of a second under overload. There is considerable difficulty in designing apparatus capable of this sensitivity and maintaining it operable at such sensitivity at all times.

I have devised a relay arrangement wherein the sensitive element comprises a high vacuum tube, providing a degree of sensitivity combined with reliability hitherto unknown. I prefer to connect the grid and plate circuits of the tube in such manner that the grid prevents any substantial or operative current flow in the plate circuit under normal conditions, and permits operative plate current flow upon occurrence of a fault or unbalanced condition.

It is one of the objects of the present invention to provide a control relay in the form of a three element vacuum tube wherein a certain alternating voltage is applied to the grid, a certain alternating voltage is applied to the plate, and the plate circuit serves as an indication of the variations in the relative phase angle between the plate and grid voltages. The two voltages may be functions of the currents flowing in different parts of the system whereby the relay may be used for differential line protection, or for protection against faults which result in a relative phase change of the currents or voltages in different parts of the system, or for protection against faults occurring within a transformer or the like.

The present invention may be employed as a protection against internal faults in power transformers such as short-circuits, faults to ground or such conditions where the power output does not balance the power input (neglecting normal losses, magnetizing current etc.). The protection is also effective for faults where the currents in the phase leads of a 3-phase transformer do not balance resulting in neutral current flow. The present invention may be such as to clear a fault instantaneously or may be modified to clear the fault after a predetermined time depending upon the characteristics necessary for the particular type of fault protection.

The invention is also applicable to the protection of generators. The generator protection is of the same general character as that to be described in connection with the transformer protection, and embodies the same features and principles of the invention.

If desired, the protection of the transformer may be so designed as to provide for separate control circuits for each transformer winding, with an individual control tube responsive to an unbalanced condition in the respective winding. The timing circuit may also be included in this modification, if so desired.

I have also provided for a differential control system responsive to relative phase angle change of the currents on the primary and secondary sides of the transformer, in order to detect faults in the transformer and to protect the external distribution system against such faults.

The attainment of the above and further objects of the present invention will be more apparent from the following detailed description which, taken in conjunction with the accompanying drawings, will disclose to those skilled in the art the particular construction and operation of preferred forms of the present invention.

In the drawings:

Figure 1 is a circuit diagram illustrating the control system applied for operation responsive to the occurrence of an internal fault in a transformer;

Figure 4 is a circuit diagram illustrating the relay protective system connected internally of a transformer;

Figure 5 is a modification of the circuit shown in Figure 4;

Figure 6 shows a modified transformer connection;

Figure 7 shows the protection circuit for one of the transformer connections shown in Figure 6;

Figure 8 is a modification of the circuit shown in Figure 7; and

Figure 9 is a modification of the transformer connection shown in Figure 6.

Figure 2:
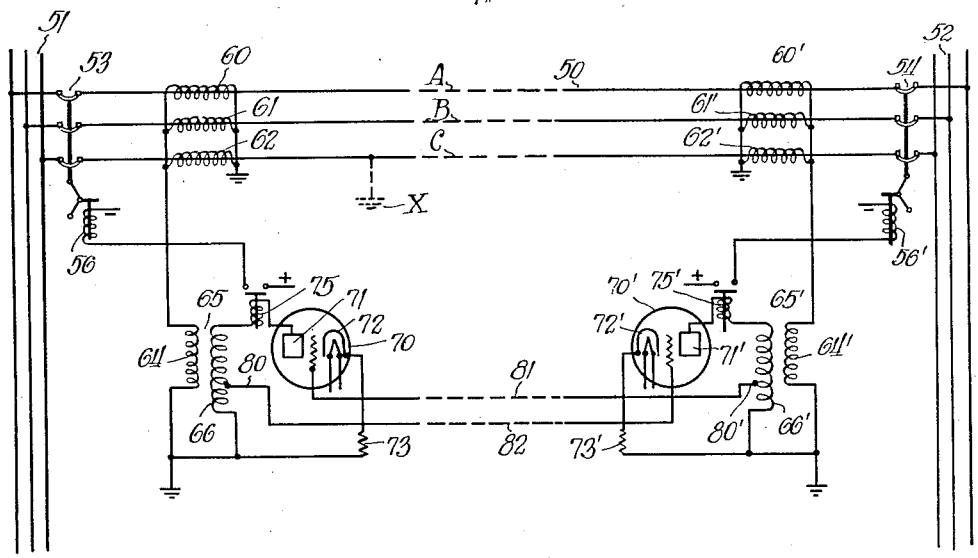
Figure 2 is a circuit diagram illustrating a pilot wire protecting arrangement embodying the principles of my invention.

Reference may now be had more particularly to Figure 2, wherein I have shown my invention applied to a section of a three phase power line for isolating the section upon the occurrence of a fault therein. The section to which the protection is applied is indicated at 50, and forms a connecting link between the two parts of the system indicated as a power line 51 and a power line 52. Circuit breakers 53 and 54 at the two ends of the section 50 connect this section with the rest of the system. The apparatus at the left hand end of the section 50 comprises three current transformers 60, 61 and 62, one for each phase of the system. The secondaries of the three current transformers are connected in parallel with one another and in parallel with the primary 64 of a special pilot transformer 65. When the load carried by the three conductors of the section 50 is balanced, no current will flow through the primary 64 of the transformer 65. The secondary 66 of the transformer 65 is connected to supply voltage to the plate of a high vacuum tube 70 of a construction similar to that of the tube previously described. The plate is indicated at 71, the cathode at 72, the cathode being grounded through a suitable resistance 73. A relay 75 is connected in the plate circuit of the tube 70, the relay controlling the tripping of the circuit breaker 53 through the trip coil 56.

At the right end of the section 50 there is provided a set of apparatus similar to that at the left hand end of the section, and similar reference numerals have been used to indicate similar parts of the two ends of the section, the reference numerals for the part at the right end of the section being primed. The secondary of the transformer 65 is provided with a tap 80 which supplies voltage to the grid of the tube 70'. A similar tap 80' on the secondary of transformer 65' supplies voltage to the grid of the tube 70. For this purpose two pilot wires 81 and 82 are provided.

Under normal operation when there is a balanced load upon the three conductors A, B and C of the section 50 no current flows through the primaries of the transformers 65 and 65', and hence there is no voltage upon the plate or the grid of the tube. The tripping relays 75 and 75' therefore remain unenergized. Under certain fault conditions current does flow through the primaries 64 and 64' resulting in an operation of the relay system to isolate the section of the line.

An explanation will now be given on the operation of this system upon the occurrence of fault at various places in the system and under various conditions. Assume that a ground fault occurs on the C phase conductor at the point marked X. Assume further that power is being sent to the fault from both the line 51 and the line 52. The unbalanced current in the current transformers 60, 61 and 62 will flow through the primary of the transformer 65 and will induce a voltage in the secondary thereof, thus placing an alternating voltage upon the plate 71 of the tube 70, and, through the conductor 82, placing an alternating voltage upon the grid of the tube 70'. At the same time power is being fed to the fault from the line 52 thereby producing a similar condition in the apparatus at the right hand end of the section 50 whereby an alternating voltage is impressed on the plate of the tube 70' and, through the pilot conductor 81, upon the grid of the tube 70 through ground. Since the lines 51 and 52 are interconnected as part of a network the voltages on these two lines will be in phase with one another, hence the current through the primaries 64 and 64' will be in phase with one another. From this it follows that the voltage on the grid of the tube 70 as supplied by the secondary 66' of the transformer 65' will be substantially in phase with the voltage on the plate 71 as supplied by the secondary of the transformer 65. A similar phase relationship exists between the voltage on the grid and plate of the tube 70'. The grids will therefore permit current to flow through the respective plate circuits and bring about the energization of the relays 75 and 75' which, upon closing, complete the circuits through the relays 56 and 56' for tripping the circuit breakers 53 and 54.

If power were being fed to the ground fault from only one end of the line the operation would be similar to that as above set forth. Assume that the line 51 is the power line and the line 52 extends to a load and is not connected to any other source of power. Fault current through the C phase conductor will result in a current flow through the primary 64 of transformer 65 in the same manner as has been previously set forth, with the result that alternating potential is applied to the plate of the tube 70 and to the grid of the tube 70'. If there is a load on the line 52, the load impedance may prevent any substantial return current flow from the A and B phases through the load to the C phase. Since the grid of the tube 70 is practically at zero potential, plate current is permitted to flow and the relay 75 is energized to trip the circuit breaker 53. If the line 52 is later energized and the fault still remains on the C phase, the circuit breaker 54 will be tripped as a result of a similar sequence of operations.

If, at the time of occurrence of the fault at the point marked X there is no load upon the conductors 52, or if the equivalent results from the fact that the circuit breaker 54 happens to be opened at the time, the operation of the system will not be adversely effected. Under such conditions there is an alternating voltage impressed upon the plate of the tube 70 and an alternating voltage impressed upon the grid of the tube 70'. There is no voltage upon the grid of the tube 70 and there is no voltage upon the plate of the tube 70'. The tube 70' therefore does not produce an operation of the relay 75'. On the other hand plate current does flow through the plate circuit of the tube 70, notwithstanding the absence of the grid potential due to the fact that the tube here employed is so designed that it is not necessary to have a grid voltage in order to initiate current flow in the cathode-plate circuit. The grid is effective only to prevent the plate current flow when the grid is at a negative potential. The relay 75 operates and brings about a tripping of the circuit breaker 53. Under such conditions it is apparent that circuit breaker 54, if it is not already open, need not be tripped if there is no load upon the line 52 and is not connected to a source of power, it is immaterial whether or not the circuit breaker 54 is open or closed.

It is to be noted that current will flow through the plate circuit of the tube when there is plate voltage and there is no impediment from the grid. Thus if the grid voltage is in phase with the plate voltage, there will be a plate current flow during each half cycle that the plate voltage is positive. The same condition will prevail when there is no voltage on the grid. However, if the grid and the plate are substantially 180 degrees out of phase, then the grid will prevent plate current flow. It is to be noted that the current transformers at the two ends of the section 50 are oppositely connected so that when the current is flowing in the same direction at the two ends of the section the unbalanced current, if any, in the primaries of the transformers 65, 65' will be in opposite directions whereas if the directions of flow at the two ends of the section are in opposition, then the resulting current in the primaries of the transformer 65, 65' will be in the same direction.

When a fault occurs externally of the section 50 but so related to the section that the unbalanced fault current flows therethrough it is not necessary, nor desirable, to open the circuit breakers 53—54 since the fault, being external of the section under consideration, should be cleared by the protective apparatus provided at the fault, thus permitting as much of the system as possible to remain in service. To show that the circuit breakers 53—54 are not tripped under such circumstances let us assume that a ground fault occurs on one of the phase conductors of the line 52 and is supplied with power from the line 51 by way of the section 50. Assume that the fault is on the C-phase conductor. An unbalanced current will flow through the section 50, the instantaneous direction of flow being the same at the two ends of the section. A large current will flow through the current transformer 62 to ground by way of the primary 64 and a similar current will flow through the transformer 62' to ground by way of the primary of the transformer 65'. It is to be noted that the secondaries of the two current transformers are oppositely connected with respect to the primaries of the associated pilot transformers 65 and 65'. Therefore the current flowing through the primaries of the transformers 65 and 65' will be approximately 180 degrees out of phase. Since each of the two tubes 70 and 71 is supplied with plate voltage from one of the pilot transformers and grid voltage from the other pilot transformer it follows that the plate and grid voltages of the two tubes will be substantially 180 degrees out of phase and hence the grids will prevent the flow of current through the respective plate circuits. Therefore the relays 75 and 75' will not operate and the circuit breakers will not be tripped.

Figure 3:
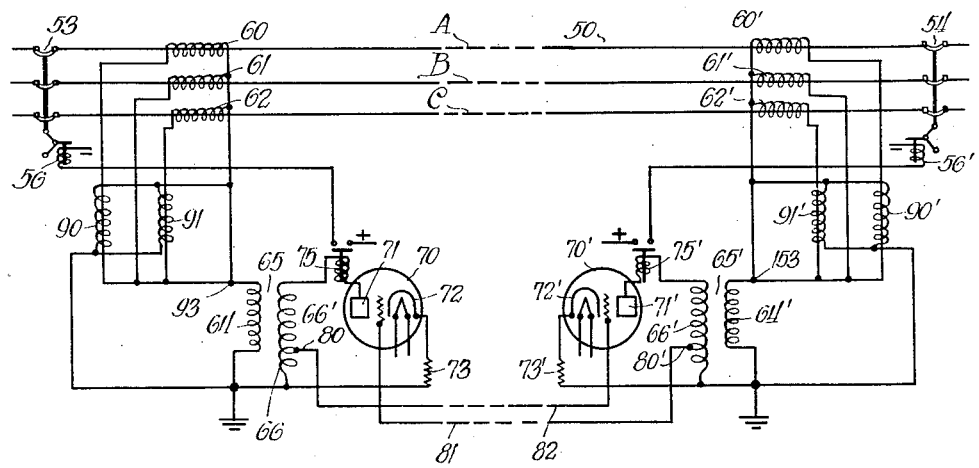
Figure 3 is a modification of the system shown in Figure 2.

Referring now to Fig. 3, wherein I show my invention as applied to a somewhat different protective arrangement, this system is identical to that shown in Figure 2 except for the fact that two additional transformers 90 and 91 are provided at one end of the section and two current transformers 90' and 91' are provided at the other end of the section. The circuit shown in Figure 3 is adapted to be connected in a system such as is shown in Figure 2. The current transformer 90 is of a ratio different from that of the current transformer 91. By way of illustration, the transformer 90 may have a two-to-one ratio and the transformer 91 a four-to-one ratio. It may be shown that a voltage will be present between the points 93 and ground through winding 64 and windings 90 and 91 upon the occurrence of an overload upon any one, two or all three of the conductors of the line 50 of Figure 3. This is true whether the overload is brought about by a phase to ground fault, a two phase fault, or a three phase fault, even though the three phase fault results in a balanced current flow through the three phase conductors of the line 50. A further description as to why this takes place is to be found in the patent to Le Clair and Gross, No. 1,919,231, of July 25, 1933. This voltage will induce a current flow through the primary of the transformer 65 with the result that a voltage will be induced in the secondary of this transformer. A similar action takes place at the other end of the section 50. The action of the two tubes in the system shown in Figure 3 will be identical to that of the tubes shown in the system of Figure 2. When the voltages on the secondaries of the transformers 65 and 65' are in phase the grids of the respective tubes will permit a current flow whereas when the voltages are 180 degrees out of phase the grids will prevent a plate current flow. It is to be noted that when the overload current is in the same direction at the two ends of the section 50, indicating that the fault is external of the section, the voltages of the secondaries of the transformers 65 and 65' will be in opposition, whereby no current flows through the plate circuit, whereas when the currents flow in the same relative directions at the two ends of the line, indicating a fault between the two ends of the line, the voltages at the secondaries of the transformers 65 and 65' will be in phase whereby the grids permit a plate current flow.

In either of the embodiments of the invention shown or described, a hot cathode tube of either the mercury vapor or high vacuum type may be employed. In a three element high vacuum tube there is substantially no current flow in the grid circuit and therefore a life indicating circuit, if employed with such a circuit, must consist of an arrangement wherein the deterioration of the tube is indicated by means of providing an additional or fourth element in the tube. This fourth element may take the form of a separate element in the tube, and a life indicating circuit of this type for a high vacuum tube is shown in detail in my first above mentioned copending application.

Another manner in which the present invention may be employed is disclosed in detail in the circuit shown in Figure 1, wherein I have illustrated my invention as applied to the protection for a transformer upon the occurrence of a fault therein. In this embodiment of the invention, a power line 10 supplies power to the primary of a transformer 11 through the usual switching connection including a circuit breaker 12. The secondary of the transformer supplies power to a feeder line 13. While I have illustrated only one phase of an alternating current system, it is obvious that the invention is applicable to a three phase system, the transformer 11 in such case being a three phase transformer, but since the conditions for each phase and the circuits therefor are identical, only one phase has been illustrated.

For current transformation I may employ a current transformer indicated at 20, and since the design of commercial current transformers now in use is such as to require that the output side of the transformer be maintained substantially short circuited, I provide an additional special potential transformer for accomplishing this. This special potential transformer is indicated at 21, and has its primary connected to the output side of the respective current transformer through a low resistance overload relay 25. I preferably provide non-arcing condensers associated with each of the relays 22 and 25. It is desirable to introduce a time delay in the operation of the relay 25, and this may be done in any desired manner, as, for instance, by providing the relay with means within the relay for delaying its action, or with external means, either mechanical or electrical, for delaying the action. A conventional type of time delay for the relay 25 is illustrated in my copending application referred to above. The secondary of the potential transformer 21 is connected from ground to the conductor 30 through a series trip circuit relay 22 and through the tube 33 back to ground. It is apparent that the voltage induced in the secondary of the potential transformer 21 will vary in some relationship to the variations in the current flowing through the corresponding conductor 10.

The conductor 30 is connected to a plate element 32 within the control relay tube indicated generally at 33, and the tube is also provided with a cathode 34 adapted to be heated by a heater 35 and provided with a grid element 36.

It will be noted that the armature 23 controlled by the series relay coil 22 in the circuit of the special transformer is adapted, in energized position, to bridge across the conductor 26, to complete a circuit from the battery 27 and the conductor 26 through the circuit breaker tripping coil 28, which is provided with an armature adapted, upon energization, to trip the circuit breaker 12. The circuit from the coil 28 extends through the conductor 29 and is completed through the armature 31 to the battery 27, the armature 31 being controlled by the time delay or overload relay 25 in the circuit of the current transformer. This relay 25 is adapted to operate after a predetermined time delay upon the occurrence of current flow therethrough in excess of the value for which it has been set. It is apparent that both the relay 22 and the relay 25 must be operated in order to complete the circuit for tripping of the breaker 12.

In the relay arrangement described, there are three important factors to consider, first, the tube operating characteristics, second, the electrical characteristics of the special plate supply transformer, and lastly, the changes in the phase angle of the line voltage with respect to the bus voltage on fault conditions.

The special transformer must have certain characteristics to operate satisfactorily in the above system. As its primary is connected in the secondary circuit of the current transformer it has to be designed so that it does not place an unreasonable burden on the current transformer when its plate winding or secondary is open circuited (normal operation). It must supply the necessary plate voltage to actuate the tube when the current transformer has full load current and when the grid and plate are in phase. At heavy overloads the special transformer secondary voltage must be limited so as not to destroy the operating characteristics of the tube. Also, its open circuit voltage must be kept at a minimum.

Considering now the grid circuit for the tube 33 of Figure 1, the grid is supplied with a voltage that varies as the current in the respective phase conductor on the secondary side of the transformer varies. For this purpose there is provided a current transformer 15, the secondary of which is connected to the primary of a potential transformer 16. The secondary of this transformer 16 is connected to the grid of the respective tube. The potential transformer 16 may be of a construction substantially similar to that of the transformer 21.

Under normal operating conditions the grid and plate voltages are approximately 180 degrees out of phase, and hence no plate current flows through the tube 33. This particular embodiment of the invention is not intended to afford protection against reverse power flow, and will afford no such protection due to the fact that upon a reversal of power flow, the relative phase relationship of the current on the primary side of the transformer 11 to that on the secondary side will remain substantially the same in so far as concerns the vacuum tube relay 33.

The apparatus is balanced so that under normal operating conditions the grid voltage and the plate voltage are 180 degrees out of phase. Should a fault develop in either the primary or secondary side of the transformer, that is, within the transformer itself, the phase relationship of the current on the two sides of the transformer will be disturbed. In addition the magnitude of the current on the primary side will be increased while the magnitude of the current on the secondary side will be decreased. As a result of this change in relative phase relationship and as a further result of the change in magnitude of the current, the grid will permit current to flow through the plate circuit during a portion of each cycle of the alternating current. Plate current controls the operation of the relay 22, resulting in the energization of the tripping coil 28 of the circuit breaker 12.

In the present instance I have employed in the system the time element overload relay 25, which may be omitted if desired. This relay may be altered as to both the time element and as to the overload element, or if it is desired to retain the time delay element that renders operation of the circuit breaker independent of the overload, the relay 25 may be omitted and a time element introduced into the operation of the relay 22.

A suitable tube life indicating circuit may be employed in the circuit described in Figure 1, and will take the form of the circuit disclosed in detail in my copending application, Serial No. 638,513, filed October 19, 1932.

In Figure 4 I have disclosed a protective arrangement for a generator or transformer, wherein an unbalanced condition in the transformer, or an external fault causing an unbalance in the currents in the phase leads, which produces a flow of current through the grounded neutral of the transformer or of a generator, results in operation of the control relay for tripping the circuit breaker to disconnect the transformer from the power circuit.

There is provided a transformer or generator indicated generally at 100, having the three windings 102, 103 and 104, which are provided with a common neutral 105 connected to ground at 106 through the conductor 107. Normally, when the three phases of the transformer are balanced, there is no current flow at the point 105, and hence no current flow through the conductor 107.

However, when one of the phases or one of the legs of the transformer becomes unbalanced, a current flow is set up at the point 105, and passes through the conductor 107 to ground. This induces a corresponding current flow in a special saturating transformer 108 connected to the conductor 107, which transformer may be of the type previously described, and which is provided with a saturating type reactor 109 connected across the terminals thereof. Reactor 109, may, if desired, be replaced by a resistance, although in the preferred embodiment of the invention I prefer to use the reactor. The current from the saturating transformer passes through the reactor, and establishes a current flow through the resistance 110 and the conductor 112 to the grid 113 of a control tube 114. The grid 113 is also connected, through the conductor 112, resistance 115, conductor 116 and the variable resistance 117 to the direct current operating bus 118. The cathode 119 of the tube is connected through the conductor 120 to a resistance 122 balanced between the negative bus 118 and the positive bus 123.

The tube 114 is also provided with a plate 124, which is connected through the conductor 125, and the relay 126 through the positive bus. Upon plate current flow from the plate 124 to the cathode 119, the relay 126 is energized to actuate the armature 127 to close the circuit across the contacts 128, which completes a circuit through the trip coil of a circuit breaker or the like for disconnecting the transformer from the power line.

Normally the grid 113 of the tube 114 is provided with a negative bias from the bus 118, which bias prevents any operative plate current flow from the plate 124 to the cathode 119. This negative bias may be of course varied as desired by variation of the resistance 117. Upon an unbalanced condition occurring in the transformer 100 resulting in current flow through the conductor 107, the transformer 108 is energized to pass a current through the resistance 110, which impresses a positive potential through the conductor 112 upon the grid 113, overcoming this negative bias. This results in placing a positive potential on the grid, which allows operative plate current to flow from the direct current bus 123 through the coil 126 and the plate 124 to the cathode 119. Energization of the coil 126 due to this plate current flow results in tripping of the circuit breaker. The sensitivity of the control may be varied in accordance with the variation of the connection of the conductor 116 to the resistance 117, so that the negative bias on the grid may be varied whereby a predetermined substantially instantaneous operation of the relay is effected upon an unbalanced condition occurring in the transformer.

In the circuit shown in Figure 5, I employ the principles of the circuit shown in Figure 4, but add thereto a time control element for delaying the operation of the tube 114 for a predetermined interval after an unbalanced condition has occurred in the transformer 100. Similar reference numerals indicate in Figure 5 portions of the circuit which are common to Figures 4 and 5.

The unbalanced condition occurring in the transformer or generator 100 results in energization of the current transformer 108, which together with the saturating reactor 109, produces an alternating current which is led through the resistance 130 and condenser 131 to the plate 132 of a rectifying tube 133. The cathode 134 of this tube is connected to the opposite side of the circuit of the saturating transformer. The alternating current transformer 108 therefore, in conjunction with the rectifying tube 133, produces a direct current positive potential which is transmitted from the plate 132 through the conductor 135 and through the resistance 130 to the grid 113 of the tube 114. It will be noted that the grid 113 is normally negatively biased as described in connection with Figure 4. The positive direct current potential provided from the rectifier tube 133 may be controlled either by the variable resistance 110' or by the variable capacitance 136, so that a predetermined time interval must elapse between operation of the saturating current transformer 108 and the removal of the negative bias on the grid 113 of the tube 114. This time delay may be varied as desired, so that a certain predetermined interval is required for the positive direct current potential to build up to a sufficient extent to overcome the negative bias on the grid. Such a time delay circuit is broadly shown in my Patent No. 2,023,653, issued December 10, 1935.

The circuit for tripping the circuit breaker operates in the usual manner upon the application of a positive potential bias to the grid 113, namely, plate current flow is established from the plate 124 to the cathode 119, resulting in energization of relay 126 and consequent tripping of the circuit breaker.

In Figure 6 I have shown a modified method of applying the protective system shown in Figures 4 and 5 to a transformer or generator to protect the system against faults developing internally of the transformer. In this particular application of the system, each of the transformer legs is separately protected by a differential relay control system, so that a fault occurring on any one of the legs will serve to operate the circuit breaker.

Referring now in detail to Figure 6, the transformer 140 having the three windings 142, 143 and 144, is provided with a common neutral 145. Each of the legs of the transformer is provided with windings at opposite ends thereof indicated at 146 and 147, which are connected together by the conductors 148, and suitable taps from these conductors lead to the primary of a special saturating transformer 149.

Normally the windings 146 and 147 of each leg are in balanced condition, that is, the current flow therethrough is such that they balance each other so that there is no substantial current flow through the conductors 148. Upon a fault occurring in any of the transformer windings, an unbalanced condition is set up between the windings 146 and 147 carried by the faulted leg of the transformer, and a current flow is set up in the conductors 148, resulting in current flow through the primary 149 of the saturating transformer. The secondary of this transformer, indicated at 150, is connected through the conductors 152 and 153 in a manner similar to that described in connection with the circuit shown in Figure 4. A suitable saturating reactor 154, corresponding to the reactor 109 of the circuit shown in Figure 4, is provided, and the remainder of the circuit is substantially the same as disclosed in connection with Figure 4, and similar reference numerals have been applied thereto to indicate corresponding parts. In the operation of the circuit, the occurrence of an unbalanced condition creates a current flow through the winding 150, which results in placing of a positive potential upon the grid 113, resulting in plate current flow from the plate 124 to the cathode 119 of the tube 114, thereby resulting in energization of the coil 126 for tripping the circuit breaker.

In Figure 8 I have disclosed a circuit corresponding to that shown in Figure 7, except for the addition of the timing elements 110' and 136, corresponding to the time delay effected in the circuit shown in Figure 5. In Figure 8, the occurrence of an unbalanced condition in one of the legs of the transformer 140 will result in flow of current to the rectifying tube 133, and in consequent flow of direct current of positive potential to the grid 113 of the control relay. When the time controlling condenser 136, or the resistance 110' has been supplied with a sufficient direct current potential to supply the grid 113 with a positive potential overcoming the negative bias normally imposed thereon, the operative plate current flow is established resulting in energization of the relay 126 to operate the circuit breaker. The details of the circuit shown in Figure 8 are the same as described in connection with Figures 5 and 7, and no further explanation is therefore deemed necessary.

In the modification shown in Figure 9, I have disclosed a transformer corresponding to that shown in Figure 6, and provided with the control windings about each of the legs thereof. However, instead of having three separate control circuits one connected to each of the windings 149, I provide for a conductor 160, which is connected by the conductors 162, 163 and 164 to the corresponding conductors 148 of the windings 146 and 147, and a conductor 170 which is connected by the leads 172, 173 and 174 to the opposite conductor 148 of the windings 146 and 147. The conductors 160 and 170 are then connected to the primary of the saturating transformer 149, which transformer is common to all of the three legs of the transformer. The remainder of the circuit is similar to that described in connection with either Figures 7 or 8, depending upon whether or not the time delay control is desired. Upon the occurrence of an unbalanced condition in any one of the legs 142, 143 or 144 of the transformer, a corresponding unbalanced condition will be set up resulting in current flow through the conductors 160 and 170, resulting in current flow through the saturating transformer 149, and thus resulting in operation of the protective control circuit to operate the circuit breaker.

It is therefore believed apparent that I have provided a control or differential protection means operative to protect a circuit against internal faults occurring within a transformer, whether by the use of a separate circuit for each of the transformer windings, or by the use of a circuit common to all of the transformer windings, whereby an unbalanced condition produced by a fault or disturbance in the transformer itself will result in operation of the circuit breaker. I have also provided for a differential protection system whereby a disturbance within a transformer will be controlled by the magnitude and phase relation of the currents on the primary and secondary sides of the transformer in such manner as to operate a circuit breaker. The differential protection means disclosed is also effective for controlling the operation of circuit breakers for isolating a section of a line when a fault occurs within the section.

While various modifications and changes may be made within the disclosure of the present invention, the invention is not to be limited to the exact circuit shown and described, but only in so far as defined by the scope and spirit of the appended claims.

I claim:

1. In a protective system for an electrical device having a plurality of phase windings, in combination, a pair of interconnected windings inductively related to the current flowing in each of said phase windings, electric valve means connected to be responsive to unbalanced current flow between said pairs of windings and adapted to have the conductivity thereof changed thereby, and relay means connected to said valve means and adapted to move from one operating position to another in response to said change in conductivity.

2. In a protective system for an electrical device having a plurality of phase windings, in combination, a pair of interconnected windings inductively related to the current flowing in each of said phase windings, electric valve means common to all of said pairs of windings and connected thereto in such manner as to be responsive to unbalanced current flow between any pair of windings and to have the conductivity thereof changed thereby, and relay means connected to said valve means and adapted to move from one operating position to another in response to said change in conductivity.

ROBT. I. WARD.